(12) United States Patent  
Romani et al.

(10) Patent No.: US 6,695,253 B1  
(45) Date of Patent: Feb. 24, 2004

(54) METHOD AND APPARATUS FOR FOLDING/UNFOLDING THE BLADES OF A ROTARY-WING AIRCRAFT ROTOR

(75) Inventors: Michel Romani, Vitrolles (FR); Marcel Cayol, Velaux (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/375,707

(22) Filed: Feb. 27, 2003

(30) Foreign Application Priority Data

Mar. 11, 2002 (FR) ............................................ 02 03013

(51) Int. Cl.$^7$ ............................................... B64C 27/50
(52) U.S. Cl. ......................... 244/6; 244/17.11; 416/142
(58) Field of Search .............................. 244/49, 17.11, 244/6; 416/1, 61, 142, 143

(56) References Cited

U.S. PATENT DOCUMENTS

| | | | |
|---|---|---|---|
| 2,950,767 A | * 8/1960 | Lemont, Jr. | ................. 416/143 |
| 3,133,715 A | * 5/1964 | Grunfelder | ................ 244/17.11 |
| 3,135,333 A | * 6/1964 | Cruz et al. | .................. 244/143 |
| 3,187,818 A | * 6/1965 | Barrett et al. | ................ 416/143 |
| 3,192,820 A | 7/1965 | Pitzer | |
| 3,749,515 A | * 7/1973 | Covington et al. | .......... 416/143 |
| 3,802,798 A | * 4/1974 | Hibyan | ........................ 416/143 |
| 4,268,222 A | 5/1981 | Bernard | |
| 4,436,483 A | 3/1984 | Watson | |
| 4,659,038 A | * 4/1987 | Hoeppner et al. | ............. 244/49 |
| 4,712,978 A | * 12/1987 | Tiemann | ...................... 416/143 |
| 5,322,415 A | * 6/1994 | White et al. | ................. 413/143 |
| 6,213,712 B1 | 4/2001 | Muylaert | |
| 2002/0081201 A1 | 6/2002 | Mondet et al. | |

* cited by examiner

*Primary Examiner*—Galen L. Barefoot  
(74) *Attorney, Agent, or Firm*—Sturm & Fix LLP

(57) ABSTRACT

To fold/unfold blades of a rotor, at least one variable-length linear actuator is removably attached to two blades locked in the flight position. A first blade is unlocked, and the actuator is actuated to vary its length and bear against the other blade which remains locked. This causes the first blade to pivot about its pivot axis and move to a folded position where it is again locked. The other blade is then unlocked and the actuator once again actuated but this time bearing against the first blade. In this way the other blade pivots into the folded position where it is again locked. The two locked folded blades may be connected to each other by a link rod. Rotors with three blades, four blades, five and six blades can be folded/unfolded with only two actuators.

30 Claims, 7 Drawing Sheets

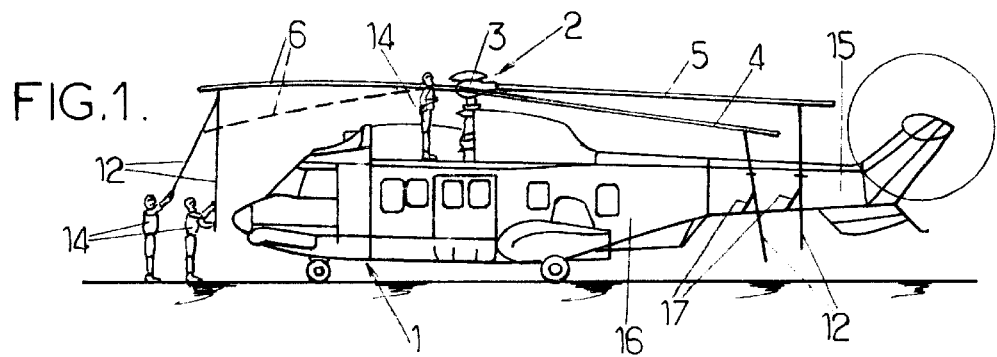
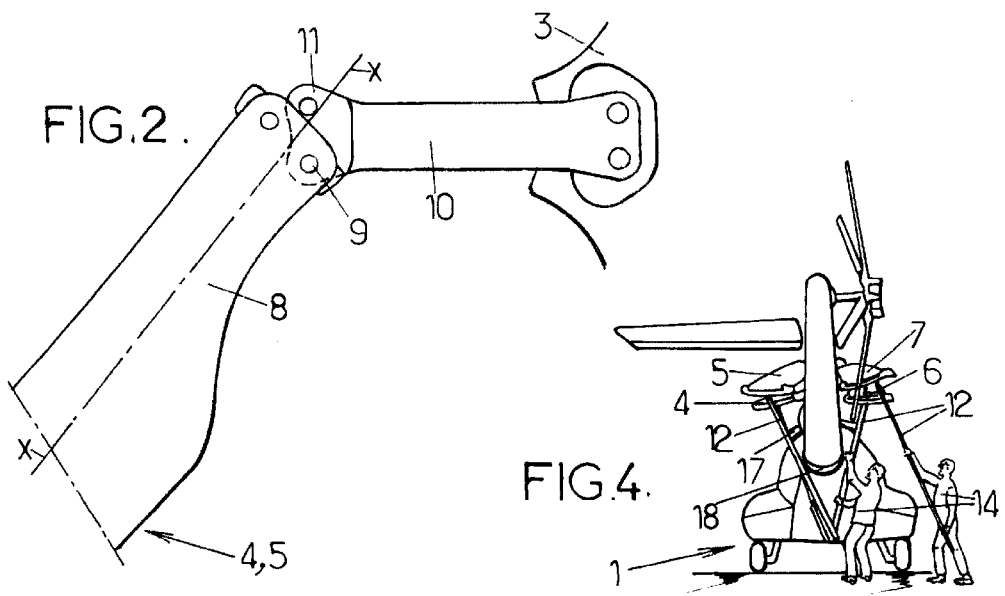
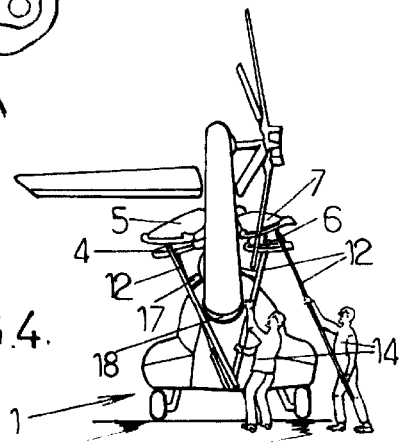
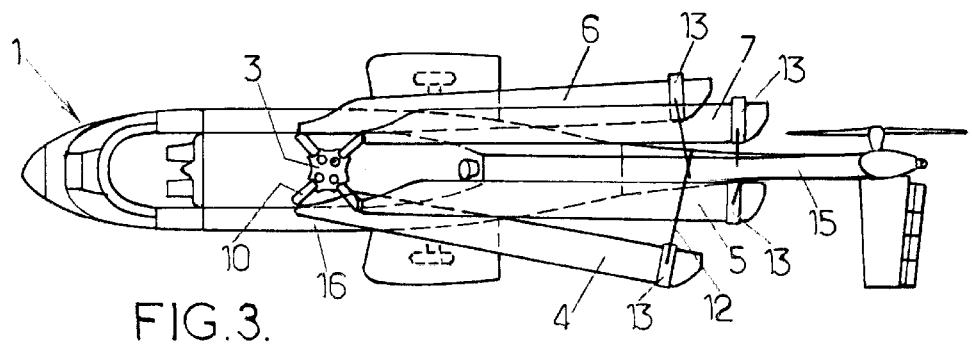

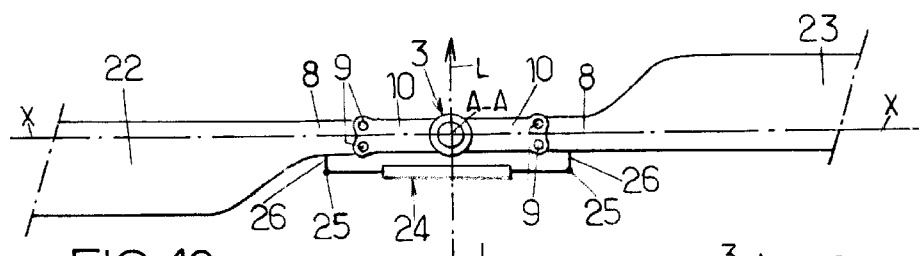
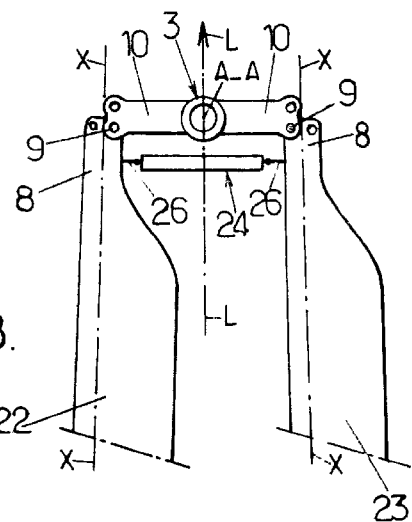
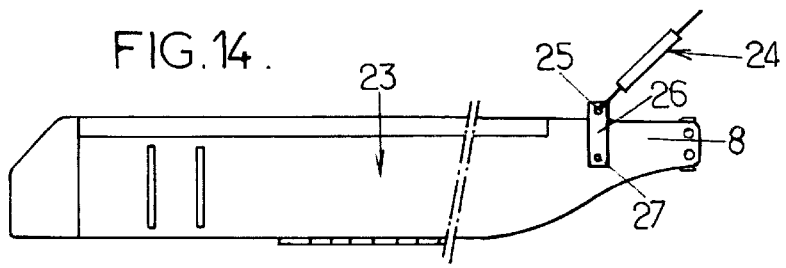
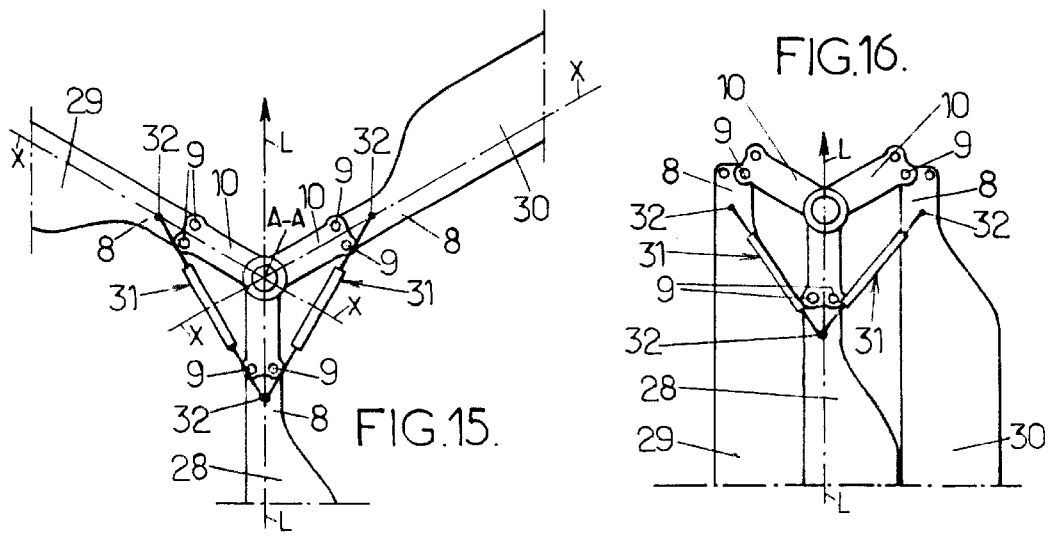
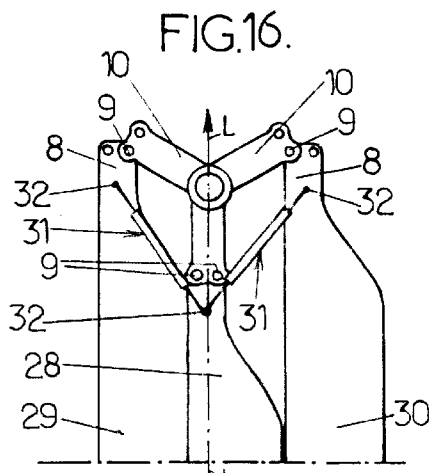

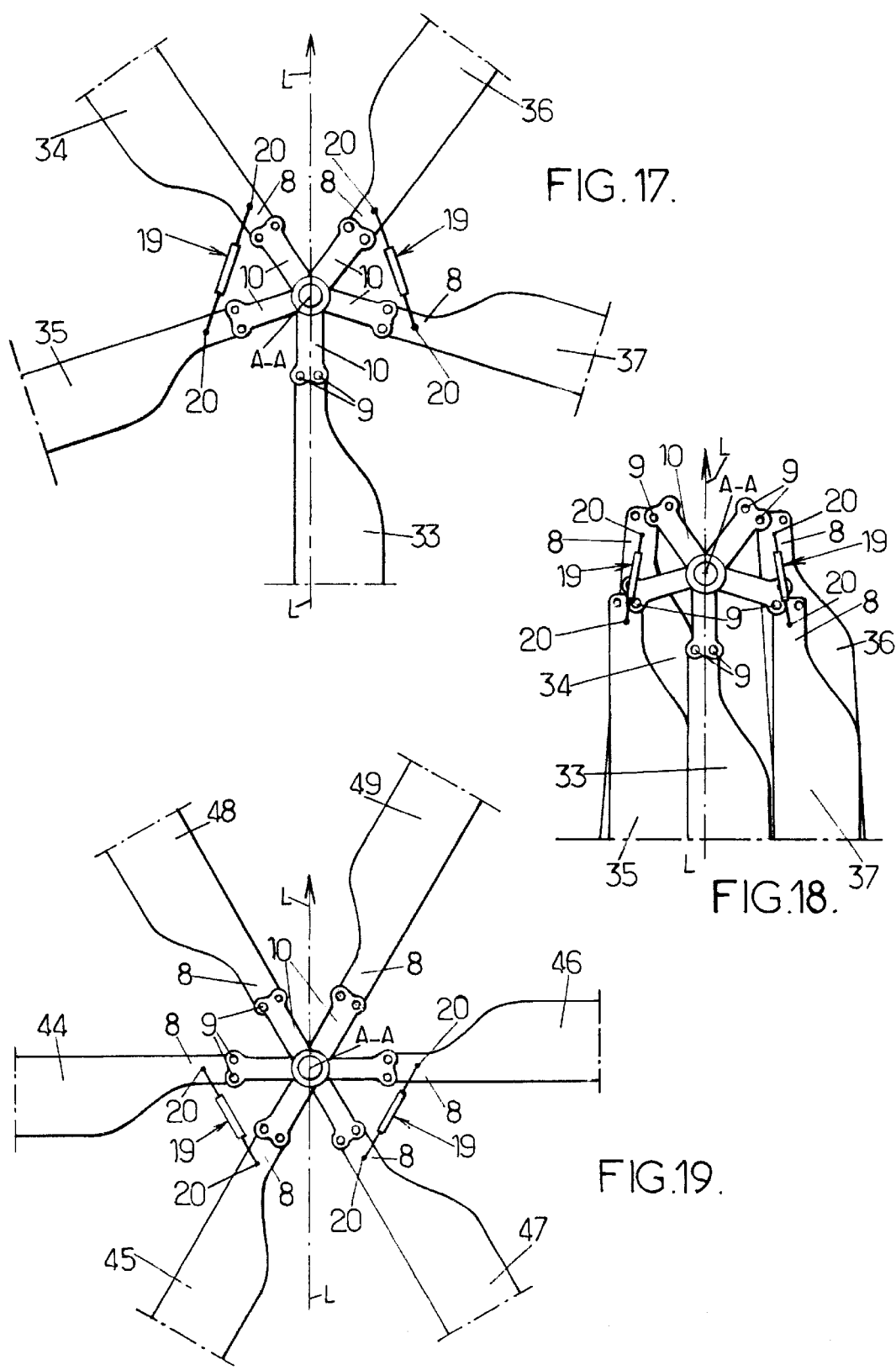

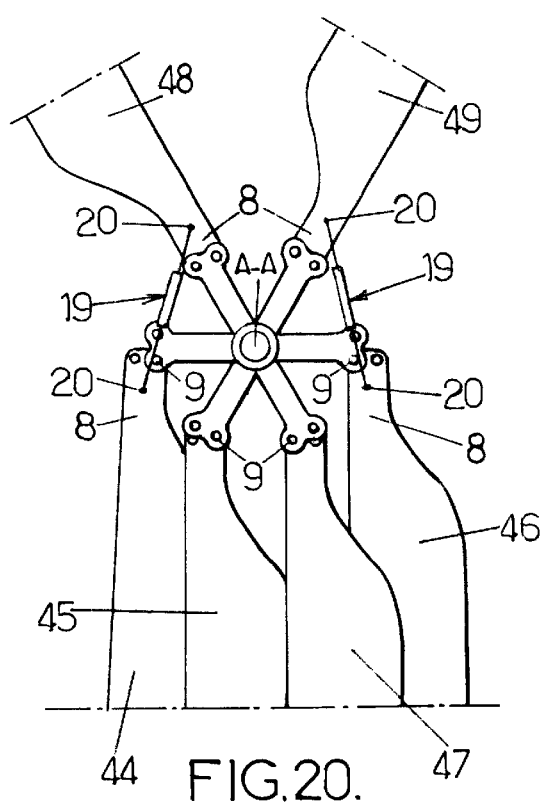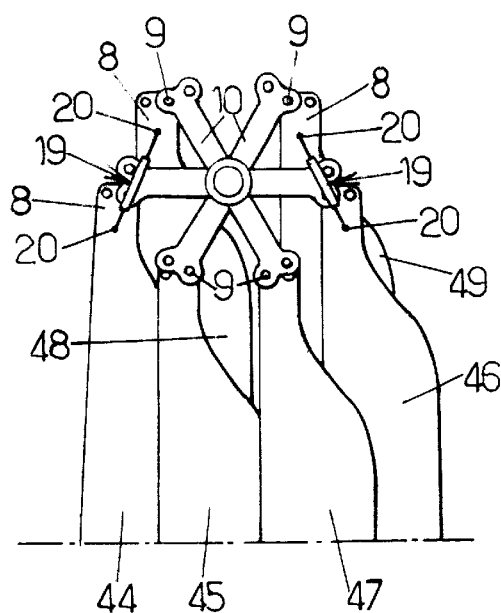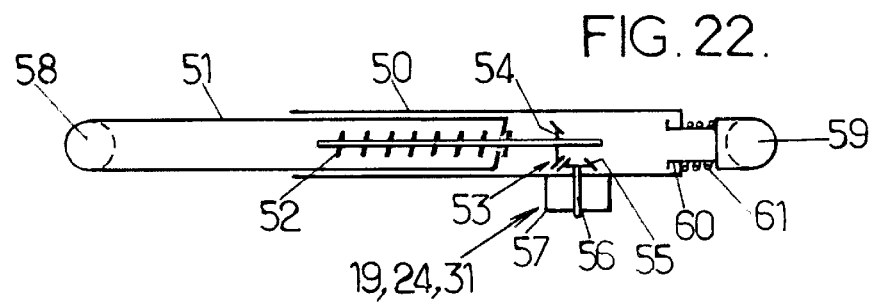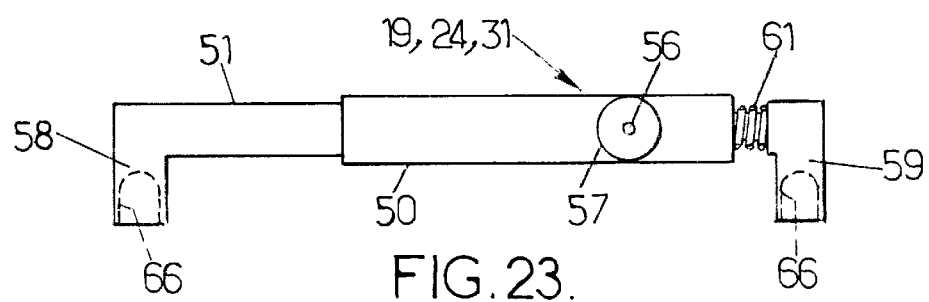

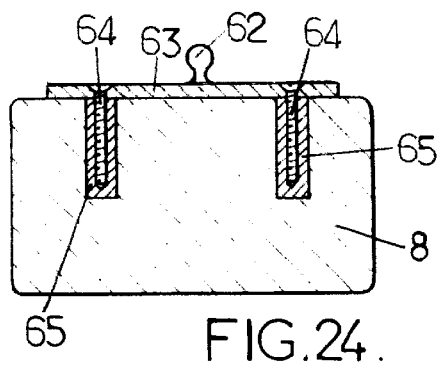
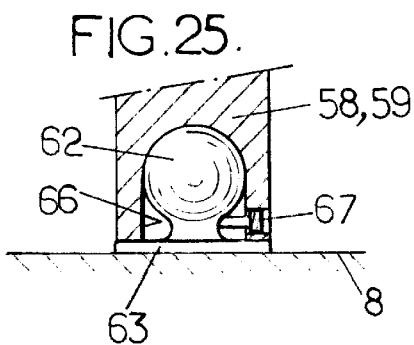
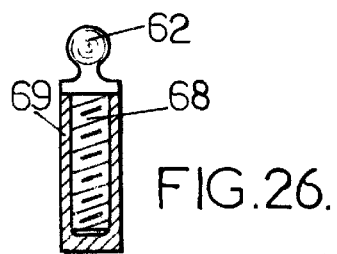
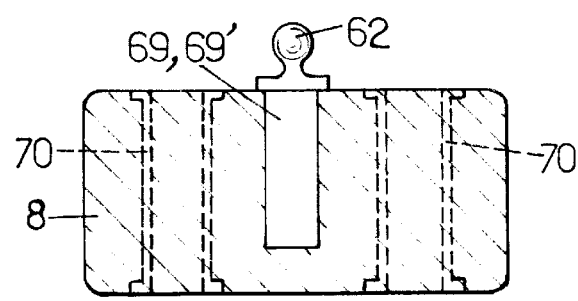
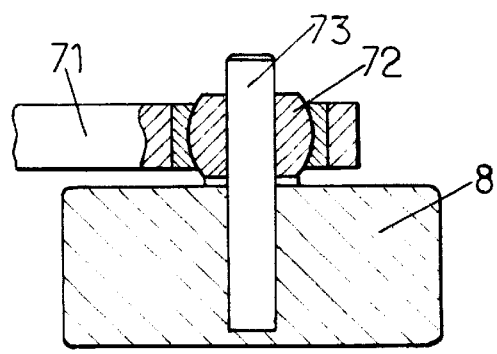
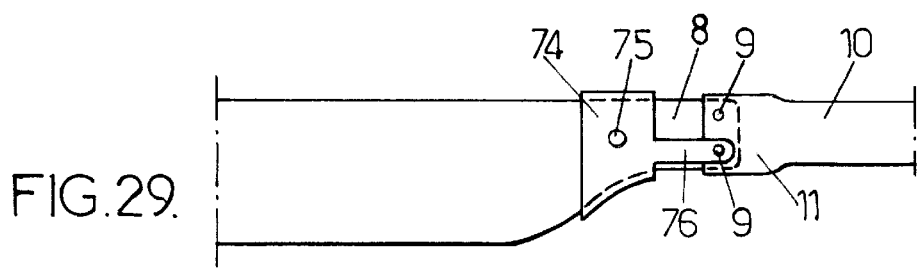
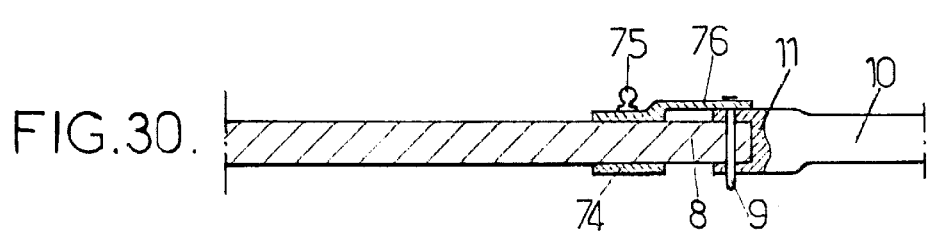

METHOD AND APPARATUS FOR FOLDING/UNFOLDING THE BLADES OF A ROTARY-WING AIRCRAFT ROTOR

FIELD OF THE INVENTION

The invention relates to a method and apparatus for folding/unfolding the blades of a rotary-wing aircraft rotor, such as a helicopter main rotor. More particularly but not exclusively, the invention relates to a method and apparatus which may be advantageously used to assist in manually folding the blades of a helicopter main rotor towards the rear, substantially along the fuselage and tail boom of the helicopter, in order to reduce the space required, during periods when it is out of service and/or in order to make it easier to stow in a hangar, especially on a ship, or to load and stow in the hold of a transport aircraft.

BACKGROUND TO THE INVENTION

In the flight configuration, rotary wing aircraft blades are connected to the rotor hub by connecting means which lock the blades in this unfolded position, in which their freedom of movement in a plane substantially perpendicular to the axis of rotation of the rotor, or the plane of the rotor disc, is very limited due to the stiffness of the means retaining the blades and hinging them to the hub being added to the stiffness of the blade drag dampers, in the case of hinged rotors, or due to the stiffness of the flexible torsion arms of the hub to which the blades are connected on rotors of the semi-rigid type.

To fold a blade, it is therefore necessary firstly to unlock it in order to allow it to have large-amplitude swing-type movement, generally towards the rear, and then to lock it in the folded position to avoid unwanted unfolding or deployment movements. To unfold or deploy a blade, i.e. to return it to the flight configuration, the sequence of operations mentioned above is carried out in reverse order, i.e. the blade in the folded position is unlocked to allow it to have large-amplitude swing-type movement, generally towards the front, and is then locked in the unfolded position or flight configuration.

These operations must be carried out in compliance with strict procedures, in order that the folding/unfolding of the blades is carried out without damaging the blades or other parts of the helicopter, and without danger to any personnel who may be present, such as operators assisting in the folding/unfolding manoeuvres.

Rotary-wing aircraft with folding/unfolding rotor blades and in particular such main rotors of helicopters, typically have at least two blades, each of which is connected to the rotor hub and locked in the unfolded position in the flight configuration by means connecting the blade to the hub comprising, as is generally the case on state-of-the-art rotors, a connecting device forming a pivot axis and at least one other device the movement of which causes the blade to be unlocked, allowing it to be folded by pivoting about said pivot axis, preferably towards the rear, substantially along the fuselage and the tail boom of the rotary-wing aircraft.

To fold the blades, two main types of folding procedures and devices are currently employed, namely manual folding, involving one or more operators, and automatic folding.

As illustrated in FIG. 2, which shows the folding of a blade of the four-bladed main rotor 2 of the helicopter 1 in FIGS. 1, 3 and 4, by pivoting this blade relative to the hub 3 of the rotor 2, it is frequently the case that the means connecting the blade to the hub comprise two pins such as 9 substantially parallel with each other, and symmetrical either side of a longitudinal axis X—X of the blade, to retain the blade root 8 in an outer radial yoke 11 of a substantially radial connecting device 10, relative to the axis of rotation of the rotor, and generally termed a cuff, itself connected to the hub 3 of the rotor 2 by retaining and hinging means (not described or shown, as they do not form part of the invention). One of the two pins 9 is removable (it is shown withdrawn in FIG. 2) to allow the blade to fold by pivoting its root 8 about the other pin 9 which thus constitutes the pivot or folding axis, as also shown in FIGS. 2 and 5 of U.S. Pat. No. 4,268,222 for respectively three-bladed and four-bladed rotors with star-shaped hubs with flexible arms.

Conventionally, manual folding takes place after preparation of the helicopter and its main rotor, this preparation consisting in chocking the helicopter by means of chocks and/or a parking brake, lining up the rotor to position the blades favourably, half of them being on the left and the other half on the right of the helicopter, substantially symmetrically relative to the longitudinal axis of the helicopter running from the rear forwards, (a blade being substantially aligned with the tail boom of the helicopter when the number of blades of the rotor is odd), locking the rotor in this position by means of a rotor brake or any other equivalent means, positioning the angle of attack of the blades at a fixed pitch value or within a certain pitch range and, where appropriate, locking the blades in pitch, so that the blades can be moved by pivoting without interference with each other or with other elements of the helicopter, then folding in succession all the blades of the rotor other than the one, if any, aligned with the tail boom, beginning on each side by folding the rearmost blade (when folding is towards the rear), and continuing on each side by folding the remaining blade, in the case of a rotor with four or five blades, or the rearmost of the remaining blades in the case of a rotor with at least six blades.

As is known and shown in FIGS. 1 to 5, for each of the blades 4 to 7, and where the means connecting each blade 4 to 7 to the hub 3 comprise, as described above and shown in FIG. 2, two blade pins 9, one of which is removable, the folding procedure consists, where folding is towards the rear, in 20 withdrawing the removable pin 9 situated furthest forward in order to unlock the blade 4 to 7 in its flight configuration, and in such a way that the blade 4 to 7 can pivot towards the rear about the one of the two pins 9 which is situated furthest to the rear, moving the blade 4 to 7 in rotation by means of a folding pole 12 equipped at its upper end with a hinged hook 13 to grip the blade close to its tip, and which is held and raised at its lower end by one or more operators 14, in order to support the blade 4 to 7, and counteract bending of the blade under the effect of its own weight, which tends to prevent the insertion or extraction of the removable pin 9 and, after rotation about the pivot pin 9 and when the blade has reached its folded position (as have the front left blade 4 and rear left blade 5 in FIG. 1) along the tail boom 15 of the helicopter 1, securing it to the rear structure of the fuselage 16 or the tail boom 15, and locking it in the folded position by means of this same folding pole 12 which is hooked on by the operator or operators 14 to supports 17 integrated in said structure (16-15), the folding pole 12 being held by straps 18 fastened to said structure (16-15).

Where appropriate, as described for example in U.S. Pat. No. 4,268,222, other tools to assist in folding may be used in addition to the folding poles, pole supports and straps, for example a support secured removably to the central parts of the hub, this support supporting the inner radial ends of rigid arms, the outer radial ends of which are connected removably to the upper end of the pivot pin of each blade or a service tool pin replacing said pivot pin, in order to limit the bending of the flexible arms of the star-shaped hub.

To facilitate the extraction and insertion of the removable blade pins, in order to facilitate the folding and unfolding of such blades, it is also known practice to use, as means of connecting the blade to the hub, expanding blade pins such as described in particular in patent U.S. Pat. No. 3,192,820, which are pins which in service run through bushes permanently installed in the blade roots and in the locked position have a diameter greater than their diameter in the unlocked position, due to the fact that they are locked by pivoting a pin lever which compresses, along the axis of the pin a stack of spring washers for example of the conical washer type, the axial compression of which causes radial expansion deforming the tubular pin which swells and is then locked in the corresponding bush of the blade root.

In the case of a four-bladed rotor (see FIGS. 1 to 5), manual folding of the four blades in succession is generally carried out in the following order: rear left blade 5, then front left blade 4, then rear right blade 7 and finally front right blade 6.

This manual folding procedure has a major disadvantage resulting from the fact that each of its steps requires the intervention of one or more operators 14, not only to withdraw the removable blade pins 9 but also and above all to support, hold and move the blades 4 to 7 by means of the folding poles 12, so that any failure by an operator 14 may lead to a loss of control of the movement of a blade. This may result in serious damage to the blades 4 to 7 and/or to the other components of the helicopter 1, as well as injuries to the operators 14. The risk is particularly great when folding is carried out in high winds, ashore or at sea, in the case of a helicopter on board ship, because of the sudden loads caused by the gusts of wind on the blades. This risk is greater still on a ship in heavy seas, since the operators are subjected to the rolling and/or pitching movements of the ship, on a deck which may be made slippery by the rain and/or the spray, etc. Operational conditions combining high winds and a rough sea make it impossible to execute rotor blade folding or unfolding operations in acceptable safety conditions. Operationally, manual folding is therefore confined to helicopters of low or medium tonnage, the blades of which have a weight which can still be controlled by the operators.

In other words, manual folding remains economical, as it can be effected using simple tools, but its operational performance and level of safety are limited.

Automatic folding procedures and devices, an example of which is described in EP 0 057 053, employ an automated sequence of operations executed by means constantly present on the rotor. In general, on an automatic folding rotor of this type, each blade has its root retained in a yoke of a folding fitting mounted so as to pivot about a folding axis at the outer radial end of a cuff connecting it to the hub, and this cuff supports at least one operating actuator, causing and controlling the pivoting of the corresponding blade and its folding fitting about its folding axis, and at least one locking actuator, causing locking or unlocking, at least in the flight configuration, on the cuff.

This type of automatic folding procedure and device can provide folding and unfolding in difficult conditions, but has major disadvantages because of the very high development and acquisition costs, so that automatic folding can only be envisaged for medium or large tonnage helicopters and, in addition, automatic folding has to be taken into account from the design stage of the rotor, and in particular of its hub, so that the installation of an automatic folding device on an existing helicopter initially lacking such a device involves complete redesign of at least the hub.

In other words, automatic folding offers an excellent level of operational and safety performance in all weathers, but its cost is extremely high, and it requires particularly stringent maintenance. This applies even more when the automatic folding device has to provide locking not only in pitch but also in drag and/or flapping of components of the hub, such as the cuffs connecting the blades to the hub.

SUMMARY OF THE INVENTION

The problem addressed by the invention is to propose a method and apparatus for folding/unfolding the blades which ensures that the folding/unfolding operations proceed satisfactorily on helicopters operating in difficult conditions, as is the case for example with helicopters on board ship, which may be subjected to particularly difficult wind and sea conditions.

Another aim of the invention is to propose a procedure and a device for folding/unfolding blades which are advantageously employed as a procedure and a device to assist manual folding/unfolding of rotor blades of the known type presented above, requiring the intervention of operators using folding poles to support the blades and facilitate withdrawal of the removable blade pins, and to move the blades in rotation and then lock them in the folded position by securing the poles to the rear structure of the helicopter.

According to a first aspect of the present invention, there is provided a method of folding/unfolding at least one blade of a multi-bladed rotor of a rotary-wing aircraft, with at least a first blade being connected to a hub of the rotor by a coupling comprising a pivotal connection defining a pivot axis and a releasable connection, release of which allows its blade to be pivoted about its pivot axis between an unfolded position and a folded position, the method comprising steps:

(a) removably attaching at least one variable-length linear actuator to the first blade and a second blade, each locked in a fixed position with respect to the hub which is itself locked stationary;

(b) releasing the first blade from its fixed position with respect to the hub;

(c) actuating the linear actuator to vary its length and bear against the second blade, thereby pivoting the first blade about its pivot axis to a new position with respect to the hub; and (d) locking the first blade in the new position.

Folding or unfolding of any other blade to be folded or unfolded may be performed conventionally or preferably by attaching said linear actuator or other similar actuator to two blades, at least one of which is to be folded or unfolded, and by employing the procedure above, step by step, until the last blade of the rotor is folded or unfolded. The procedure according to the invention can therefore be employed with a single actuator, whatever the number of blades, provided that the actuator is moved to different positions on the rotor in the course of the folding or unfolding operation.

This procedure according to the invention can assist and even replace the action of the operators employing a conventional manual folding/unfolding procedure, by means of at least one simple removable actuator, which may economically be a simple double-acting linear jack, to provide the energy required for pivoting the blades, and to control this pivoting, so that although folding poles, which may be identical to those used at present, are attached to the blade tips and handled by operators on the ground, the only function of these poles, after the removable blade pins are extracted, is to prevent unwanted vertical movements due to gusts of wind on the blades, since the folding or unfolding manoeuvre properly so-called is performed by the removable linear actuator, whereas in conventional manual folding, these poles are also used to move or hold blades in rotation to fold or unfold them.

In one embodiment, where the second blade is coupled to the hub of the rotor in an analogous way to the first blade, the method further comprises after step (d) steps:
(e) releasing the second blade from its fixed position with respect to the rotor;
(f) actuating the linear actuator to vary its length and bear against the first blade, thereby pivoting the second blade about its pivot axis to a new position with respect to the hub; and
(g) locking the second blade in its new position.

This procedure, combining the action of at least one removable linear actuator with suitable steps of locking and unlocking the blades, enables said removable linear actuator, or each of them, to manoeuvre a first, unlocked blade, by bearing against the second, locked blade, and then to manoeuvre the second, unlocked blade, by bearing against the first, locked blade, which minimises the number of linear actuators required and the number of times they are operated, a single actuator being sufficient whatever the number of blades, if it is moved to different positions on the rotor, in the course of the folding or unfolding operation.

Also advantageously, before step (f) the method may further comprise removably attaching a link rod to the first blade locked in its new position and to a third blade whose position is fixed with respect to the hub, whereby under subsequent actuation the linear actuator bears against the first and third blades together when the second blade pivots about its axis. A link rod of this type, in particular when it is attached to two locked blades folded towards the rear, because of its stiffness strengthens the assembly comprising these two folded rear blades, the hub of the rotor and the rear part of the fuselage, to which the two folded blades are connected by being locked in this position. However, this rod is not essential if the dimensioning of this assembly is compatible with the forces encountered during the complete folding procedure and during the period of immobilisation, in particular to enable it to withstand gusts of wind.

For implementation of the method aspect of the invention as presented above, there is also proposed apparatus for folding/unfolding at least one blade of a multi-bladed rotor of a rotary-wing aircraft, with at least a first blade being connected to a hub of the rotor by a coupling comprising a pivotal connection defining a pivot axis and a releasable connection, release of which allows its blade to be pivoted about its pivot axis between an unfolded position and folded position, the apparatus comprising:
  at least one variable length, removable linear actuator configured to be removably attached to two adjacent blades of the rotor and to exert forces in either direction along its longitudinal axis on two blades connected by the linear actuator; and
  connectors for removably attaching the linear actuator to two adjacent blades, each connector comprising an end fitting integral with the linear actuator and an attachment device configured for attachment to one blade, the end fitting and the attachment device being releasably interconnectable.

For rotors with at least three blades, it is sufficient for the folding/unfolding apparatus to comprise a single actuator, but preferably two linear actuators, preferably substantially identical, each fitted at each of its two longitudinal ends with an end fitting for attaching removably to at least one attachment device fitted to a blade, so as not to have to carry out too great a number of operations successively fitting and removing a single actuator to fold or unfold all the blades.

Advantageously, the device comprises in addition at least one substantially rectilinear removable link rod, designed to be removably attached to two blades, in particular two blades locked in the folded position towards the rear, said rod being fitted for this purpose and at each of its two longitudinal ends with means for connecting it removably to one respectively of the blades.

The folding/unfolding method and apparatus aspects of the invention have the advantages that, because at least one removable linear actuator is used, movement of the blades is caused and controlled, thus avoiding any undesirable movement of a blade which might have broken free from the operators, so that for a reasonable cost of such a device, the blades can be folded safely in strong winds and/or heavy seas. The procedure and device according to the invention thus fill the gap which currently exists between the procedures and devices for manual folding, of low cost but with limited performance and safety, and automatic folding procedures and devices, offering good performance and good safety, but at very high cost.

Compared with an automatic folding device, the rotary-wing aircraft rotor of which the blades are to be folded does not permanently carry the folding/unfolding device of the invention, which is fitted to the rotor only when the rotary-wing aircraft is on the ground, at least during the blade folding/unfolding operations and, where appropriate, during the period of immobilisation of the folded blades. The saving in weight and therefore improvement in performance is very appreciable, since for a helicopter of the eight to ten tonne class, the weight saved is of the order of 100 kg.

In addition, as the folding/unfolding apparatus is only a tool used solely on rotary-wing aircraft on the ground, this tool is not subject to the same rules and constraints as equipment used in flight. The result is that development, acquisition and maintenance costs are markedly lower than those of a device carried on board the aircraft.

The invention may be applied to all types of existing helicopter rotors, whatever the number of blades, provided that the blades are able to pivot, substantially in the plane of the rotor disc, about one of the means connecting them to the hub (pin, bolt or other equivalent means). Adaptation of the invention to an existing helicopter requires no modification of the hub, in particular of the main rotor, and only the blades have to be equipped with means for removably attaching the linear actuator or actuators, and these attachment means may be at least partially integrated into the blades or completely removable from the latter.

For a new helicopter or more simply a new rotor, in particular a main rotor, for which blade folding is required, the folding/unfolding method and apparatus aspects of the invention do not add design constraints with regard to folding, so that the prime function of the hub, which is to control the lift of the rotor, can be optimised.

Depending on the number of blades of the rotor, the core method and apparatus defined above must be adapted to each rotor, but the same basic principle still applies, using at least one linear actuator attached to two adjacent blades of the rotor and bearing against one locked blade, to cause the other, unlocked, to pivot.

TWO-BLADED ROTOR

For a two-bladed rotor with blades which can be folded towards the rear, the method may further comprise:

locking the stationary rotor with the first and second blades aligned substantially transversely to a longitudinal axis of the rotary-wing aircraft; and attaching pivotally the linear actuator to a forward part of one blade and a rearward part of the other blade such that the linear actuator extends rearwardly of a line passing through the pivot axes of the two blades, and such that the linear actuator is disposed rearwardly of the hub of the rotor.

In this way, steps (a) to (d) may be used to bring the first blade from its transversely aligned fixed position to the new position towards the rear of the rotary-wing aircraft, and steps (e) to (f) may be used to bring the second blade 10 from its transversely aligned fixed position to its new position. In this case, the method may in addition comprise the step consisting in attaching the actuator to the blades by means of two securing brackets previously removably attached, one projecting towards the front of the leading edge of the root portion of one blade and the other projecting towards the rear of the trailing edge of the root portion of the other blade.

THREE-BLADED ROTOR

In the case of a three-bladed rotor with blades which can be folded towards the rear, the method may further comprise:

locking the stationary rotor with the second blade aligned over the rear part of the rotary-wing aircraft;

removable attaching a variable-length linear actuator to the second and third blades;

releasing the third blade from its fixed position;

actuating the linear actuator to vary its length and pivot the third blade about its pivot axis to a new position with respect to the hub; and locking the third blade in its new position.

In this way, steps (a) to (d) may be used to bring the first blade from its fixed position (unfolded configuration) to the new position towards the rear of the rotary-wing aircraft and adjacent the second blade, and the third blade may be likewise be moved from its fixed position (unfolded configuration) to its new position adjacent the second blade. As a variant, a single actuator may be removably attached firstly to the second blade and to one of the other two blades, to fold or unfold it, then detached and removably attached to the second blade, and to the other of the other two blades, to fold or unfold the latter.

In cases where two actuators are used, the method may advantageously comprise in addition the step consisting in attaching the two actuators substantially to the same attachment point on the rear blade, substantially along the longitudinal axis of said rear blade and radially towards the outside of the pivot axis of said rear blade relative to the axis of rotation of the rotor.

ROTOR WITH AT LEAST FOUR BLADES

Finally, to fold towards the rear the blades of a rotor with at least four blades, with a third blade and fourth blade each connected to and fixed in position with respect to the hub of the rotor in an analogous way to the first blade, the method further comprises:

locking the stationary rotor with the first and second blades disposed on one side of the rotary-wing aircraft and the third and fourth blades disposed on an opposite side, with the first blade rearwardly of the second blade and the third blade rearwardly of the fourth blade, carrying out steps (a) to (d) so that the new position of the first blade is over the rear part of the rotary wing aircraft;

repeating steps (a) to (d) for the third blade in place of the first blade so that the third blade is positioned adjacent the first blade;

carrying out steps (e) to (f) for the second blade so that the second blade is positioned adjacent the first blade;

repeating steps (e) to (f) for the fourth blade in place of the second blade so that the fourth blade is positioned adjacent the third blade.

The method may further comprise connecting the first blade to the third blade with a removable link when the first blade is in the new position and the third blade is positioned adjacent to it. As a variant, a single actuator may be used, but it must then be frequently moved to different positions on the rotor in the course of the work.

If the multi-bladed rotor has an odd number of blades, the stationary rotor is locked with one blade positioned over the rear part of the rotary-wing aircraft. In all cases, each blade may be advantageously locked in the folded position by attaching said blade to the rear structure of the rotary-wing aircraft, by means of attachment tools such as folding poles and/or straps and/or supports, as is already known in manual folding.

Regarding the apparatus for folding/unfolding the blades, the removable linear actuator, or each of them, may advantageously comprise at least one double-acting linear jack, comprising at least one rectilinear rod moveable axially in both directions in a jack body, into which said rod is partially inserted and driven by a drive device housed in the body.

The jack may be a fluid-operated jack, i.e. a pneumatic or hydraulic jack, powered either from a pneumatic or hydraulic circuit on board the helicopter, or from the pneumatic or hydraulic outlet of a ground power unit.

However, as this jack is a tool to be installed temporarily on the rotor, it is advantageous for reasons of lightness, bulk and ease of use that this jack should be a simple, lightweight and therefore economical structure, and in particular a mechanical or electromechanical jack, the body of which houses a mechanical drive device with multiplication of force at the rod. In the case of an electromechanical jack, a reduction gear unit driven by an electric motor may be integrated in the jack body and powered from the on-board electrical network of the helicopter or the electrical outlet of a ground electrical generating unit.

Nevertheless, whether the jack drive is mechanical and provided manually or assisted by an electric motor, it is advantageously simple and practical for the mechanical drive device with multiplication of force at the rod to comprise at least one stage of reduction gearing engaged with the rod and using a worm screw, driven in rotation in the body, and/or with gear wheel and pinion gears, said reduction gearing stage comprising at least one input shaft, designed to be driven from the outside of the jack body by mechanical operating means, such as a crank, or electromechanical means, such as a cordless screwdriver, with a battery powered electric motor.

In a simple, economical but nevertheless effective mode of embodiment, the drive device with multiplication of force at the rod comprises a worm gear meshing with the tubular rod into which the worm gear partly extends, and driven in coaxial rotation by an output gear of bevel gearing of which an input opinion is integral with the input shaft, accessible from the outside of the jack body.

Advantageously, to bring together the removable attachment end fittings of the jack and their respective attachment points on the blades, the jack also comprises a manually operated mechanism for disengaging the rod, allowing rapid and simple adjustment of the jack to the desired length, for it to be attached by its end fittings to the attachment devices on two adjacent blades.

Moreover, to reduce loads due to any impacts at the end of the folding or unfolding movement, in particular when an unfolded blade approaches the hub of the rotor or the means of connecting it to this hub, the jack also comprises shock absorbing means, such as at least one axial spring and/or at least one block of elastically deformable material, in series with the rod and/or the body and/or at least one of the end fittings of the jack.

In addition, to avoid the moments induced in the links between the jack and the two blades which it connects by a combination of the pivoting of a folded or unfolded blade and the generally non-zero angle of attack of this blade, the connectors for removably attaching the actuator to the blades comprise at least one ball joint connecting at least one removable attachment end fitting of at least one actuator to at least one corresponding attachment device on a blade, so as to allow the actuator or jack to swivel.

To this end, the ball joint may comprise at least one swivel ball of at least one removable attachment ball joint end fitting of the actuator or jack which cooperates with an attachment pin comprised in said attachment devices fitted to a blade.

However, it is also possible for the ball joint to comprise at least one swivel ball supported by the attachment devices fitted to a blade, so that this swivel ball projects above a portion of root of the blade, and at least one end sleeve of a removable attachment elbow end fitting of an actuator or jack, said sleeve being designed to fit and lock releasably on the swivel ball. This swivel ball may be supported by a support retained by at least one pin or at least one screw in at least one insert of the attachment devices which is integrated in a root portion of the blade, but, as a variant, the swivel ball may be supported by a support integrated directly as an insert in this root portion of the blade.

Generally, the devices attaching an actuator or jack to a blade may be completely integrated in this blade, or comprise at least one attachment element fitted by a removable attachment into at least one other attachment element such as an insert integrated into the root portion of the blade. In both these cases, the blade is not standard, but specific to the folding blade rotor which comprises it.

As a variant, all the devices for attaching an actuator or jack to a blade may be removably fitted to this blade, which is then standard. In a preferred mode of embodiment of attachment means of this type, these attachment means comprise a retaining collar supporting a swivel ball or a pin cooperating with a swivel ball, this retaining collar being removable and designed to grip a part of the root portion of a blade by being locked to the latter by snug fitting and also by a spacer keeping the retaining collar spaced radially towards the outside of the pivot axis of this blade, about which the spacer can pivot with the retaining collar and the blade.

BRIEF DESCRIPTION OF THE DRAWINGS

Other characteristics and advantages of the invention will emerge from the description given below of examples, though not limited to these, of embodiments described with reference to the attached drawings in which:

FIG. 1 shows schematically in side elevation a helicopter with a manually folding four-bladed main rotor according to the state-of-the-art, FIG. 2 is a partial plan view of a blade root pivoting on a device connecting it to the hub, in the process of being folded, FIG. 3 is a schematic plan view showing the helicopter in FIG. 1 on which the four main rotor blades are folded, FIG. 4 is a view from the rear of the helicopter in FIGS. 1 and 3 when folding is finished, FIGS. 12 and 13 are partial schematic plan views showing the folding of the blades of a two-bladed rotor according to the procedure and with the device of the invention, FIG. 14 is a schematic plan view of a variant two-bladed rotor blade, FIGS. 15 and 16 are partial schematic plan views showing the folding of the blades of a three-bladed rotor by the procedure and with the device of the invention, FIGS. 17 and 18 are figures similar to FIGS. 15 and 16 for a five-bladed rotor, FIGS. 19 to 21 are also views similar to FIGS. 15 and 16 for the folding of a six-bladed rotor, FIGS. 22 and 23 are schematic views respectively in axial section and side elevation of a mechanical jack which can be used as a linear actuator in the device of the invention, FIGS. 24 to 28 show schematically different modes of embodiment of the means for removable attachment of the end fittings of the jack in FIGS. 22 and 23 to the blade roots, and FIGS. 29 and 30 show schematically and respectively in plan and side elevation, removable attachment devices fitted to a blade for attaching to the latter an end fitting of the jack.

DETAILED DESCRIPTION OF SPECIFIC EMBODIMENTS

Figure 5:
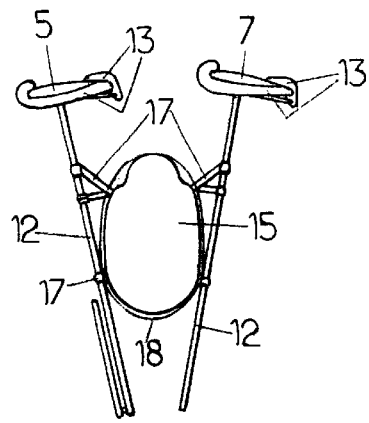
FIG. 5 is a schematic view partly in section and partly in rear elevation, showing the locking of two blades of the main rotor of the helicopter in FIGS. 1, 3 and 4 locked in the folded position by means of folding poles, straps and support arms.

FIGS. 6 to 11 show a sequence of folding towards the rear, according to the procedure and with the device of the invention, of the blades 4 to 7 of the four-bladed main rotor 2 of the helicopter 1 in FIGS. 1 and 3 to 5 described previously, each blade being kept locked, as is also the case in the other examples of rotors described below, by its root 8 in the flight configuration, in the unfolded position, on a cuff 10 connecting it to the hub 3 of the rotor 2 by two blade pins 9, parallel to each other and substantially symmetrical on either side of the longitudinal pitch change axis X—X of each blade, and one of the pins 9 of which, situated nearest the front of the helicopter, is removable to allow the blade to be folded towards the rear by pivoting about the other pin 9, situated nearest the rear of the helicopter, and constituting a pivot pin or folding/unfolding pin of the blade considered, as described above with reference to FIG. 2.

Before the folding operation is carried out, the helicopter 1 and its main rotor 2 are first prepared in the same way as for conventional folding, i.e. by means of a parking brake and/or chocks, the helicopter is chocked, and then the rotor 2 is lined up so as to position blades 4 to 7 favourably by arranging them substantially symmetrically relative to the longitudinal axis L—L of the helicopter, on which an arrow indicates the front of the helicopter, one half of the blades, i.e. blades 4 and 5, on the left side and the other half, i.e. blades 6 and 7, on the right side of the helicopter, and the rotor 2 is locked in this position by using a rotor brake or any other equivalent means. The angle of attack of the blades 4 to 7 is also positioned at a fixed value or within a certain pitch range, and where appropriate locked, to allow the blades 4 to 7 to be moved without interference between blades or with other components of the rotor 2 and, more generally of the helicopter 1.

Two linear actuators 19, preferably identical, of variable length, are then removably attached to the rotor 2 by attaching one of them to the two left-hand blades 4 and 5 so that this actuator 19 extends between the roots 8 of these two blades 4 and 5, to each of which the actuator 19 is removably attached by one respectively of two end fittings at the axial ends of the actuator 19, to one of the two attachment points 20, formed by attachment devices fitted to the blades and described below, these attachment points 20 being situated on the roots 8 of the blades 4 and 5, substantially on the longitudinal pitch change axis X—X of each blade 4 and 5, and radially to the outside of the corresponding blade pins 9, relative to the axis of rotation A—A of the rotor 2, at the centre of the hub 3.

Figure 6:
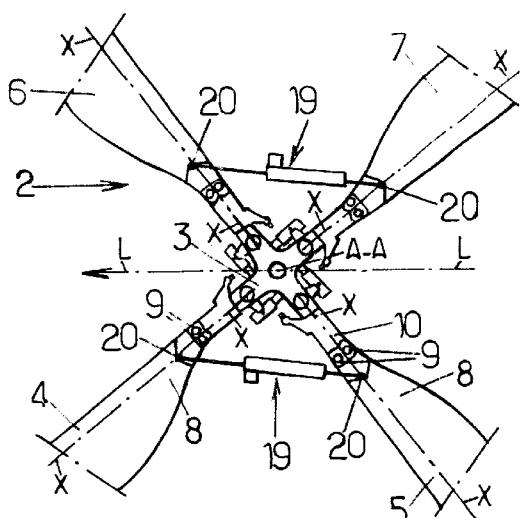
FIGS. 6 to 11 are partial schematic views in plan of the head of the four-bladed main rotor of the helicopter in FIGS. 1 to 4 on which is fitted a folding device according to the invention, these figures showing a sequence of folding the four blades towards the rear.

The other linear actuator 19 is fitted removably in the same way to the right-hand blades 6 and 7, as shown in FIG. 6.

In a practical manner, each linear actuator 19 is a double-acting linear jack, preferably a mechanical jack as described below with reference to FIGS. 22 and 23, and fitted at both of its axial or longitudinal ends with removable attachment end fittings cooperating with removable attachment devices fitted to the blades, and preferably such as described below with reference to FIGS. 24 to 30.

Figure 7:
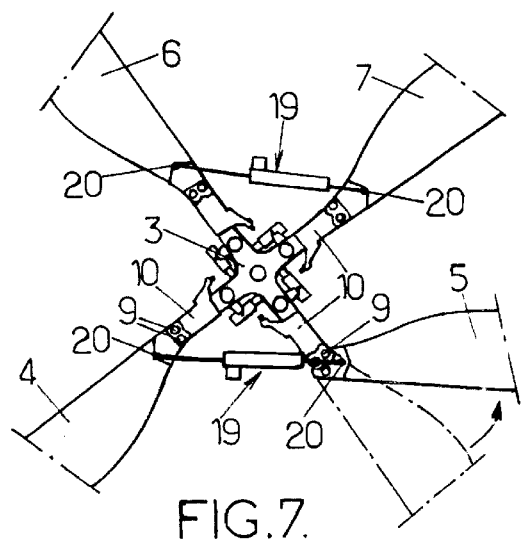

After each of the two actuators 19 is attached to two adjacent or consecutive blades 4, 5 or 6, 7 of the rotor 2, on the same side of the helicopter, and locked in the flight configuration, the rear blade for example on the left side 5 is unlocked by withdrawing its front blade pin 9, while the front left blade 4 remains locked in the flight configuration. The left actuator 19 is caused to extend, which has the effect of pushing the rear left blade 5 towards the rear, as shown in FIG. 7, by pivoting about its pivot pin 9, which is the rear pin kept in the initial position. The actuator or jack 19 provides the energy to drive the blade 5 in pivoting and controls the pivoting movement, in the course of which the blade 5 may be held at the tip by an operator using a folding pole 12 with a hinged hook 13 at its upper end, as described above with reference to FIGS. 1 to 5, in order to avoid accidental vertical deflection of this blade 5 as a result of gusts of wind. When folding of the blade 5 is finished, the latter is locked in the folded position by attaching it to the tail boom 15 or to the rear structure 16 of the fuselage by means of a pole 12, supports 17 and straps 18 as previously described with reference to FIGS. 4 and 5.

Figure 8:
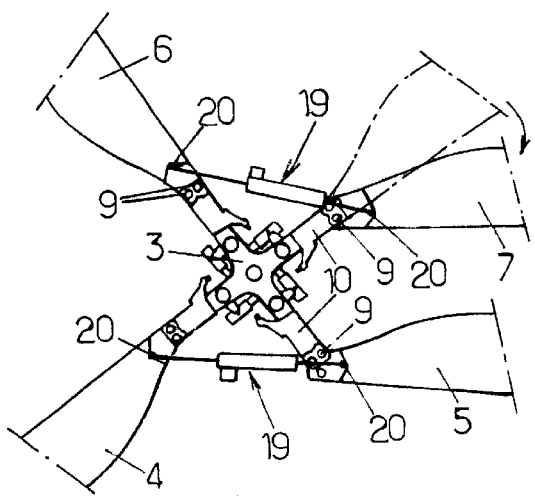

Then, keeping the front right blade 6 locked in the flight configuration, the rear right blade 7 is unlocked by withdrawing its blade pin 9 located towards the front, and the right-hand actuator or jack 19 is caused to extend, which has the effect of causing the rear right blade 7 to pivot towards the rear about its pivot pin 9, the rearmost, and kept in the initial position as shown schematically in FIG. 8. The rear right blade 7 folded towards the rear is then locked in this position by being attached to the tail bloom or rear structure of the helicopter fuselage, as explained above for the rear left blade 5.

The two rear blades 5 and 7 are then locked in position folded towards the rear.

Figure 9:
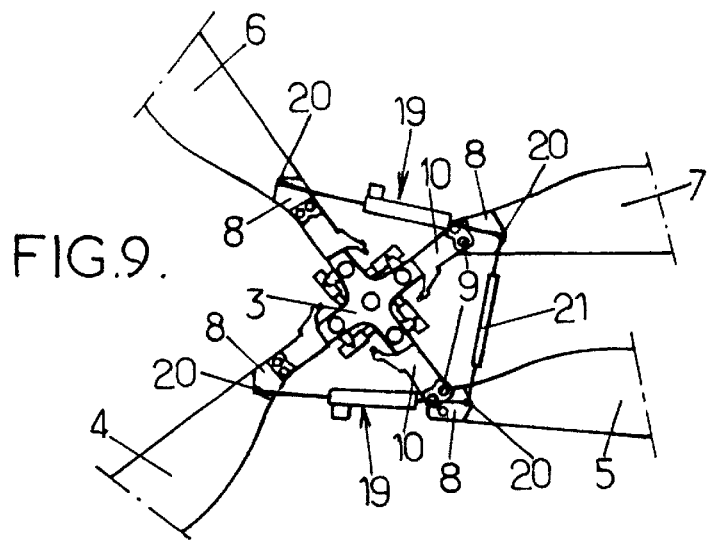

As shown in FIG. 9, a rectilinear rigid link rod 21 may then be removably attached between the two rear blades 5 and 7 locked and folded, and this rod 21 is preferably removably attached by two axial end fittings of the rod 21 at the two attachment points 20 of the two actuators or jacks 19 to the roots 8 of these two rear blades 5 and 7, using quick-connection means of any known suitable type, for example of the same type as the devices for removably attaching the jacks 19 to the blades.

The rigid link rod 21, which is optional, has the effect of strengthening the assembly constituted by the two rear blades 5 and 7, locked folded to the fuselage, the hub 3 and the rear structure of the fuselage 16 or of the tail boom 15.

The front left blade 4 is then unlocked by withdrawing its front blade pin 9, and the left jack 19 is caused to retract, which has the effect of pulling the front left blade 4 towards the rear and causing it to pivot about its pivot pin 9, kept in the initial rear position, and when the front left blade 4 is folded towards the rear along the rear part of the fuselage 16 and of the tail boom 15, this front left blade 4 is locked in position folded towards the rear by attaching it to the tail boom 15 or rear structure 16 of the fuselage, as for the two rear blades 5 and 7 previously folded (see FIG. 10), or to the rear left blade 5 previously folded.

The front right blade 6 is then unlocked by withdrawing its front blade pin 9 and, by retracting the right jack 19, the front right blade 6 is pulled and made to pivot towards the rear about its pivot pin 9, kept in the initial rear position, and the front right blade 6 is then locked in position folded towards the rear (see FIG. 11) by its attachment to the tail boom 15 or rear structure 16 of the fuselage, as for the other blades previously folded, or to the rear right blade 6 previously folded.

In the course of these operations of extension or retraction of the jacks 19, each of them bears against a blade kept locked to push or pull the other blade to which this jack is connected, moving the blade by pivoting it.

Figure 10:
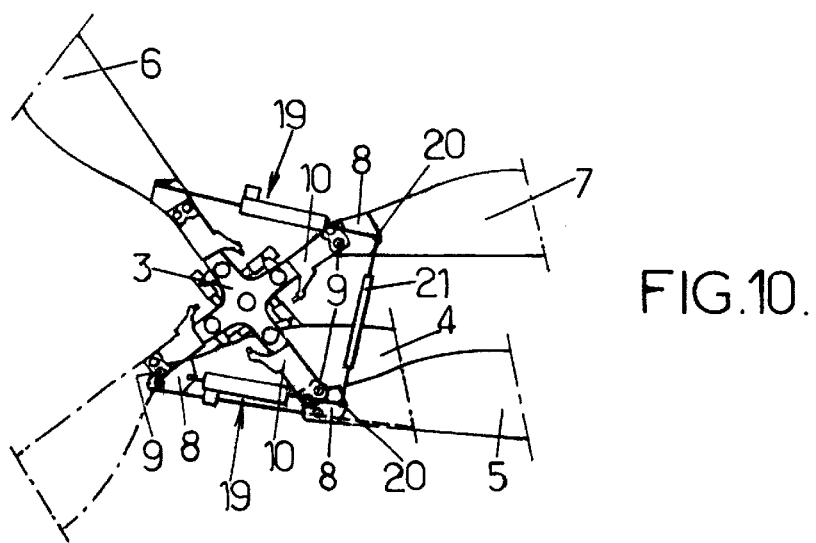
Figure 11:
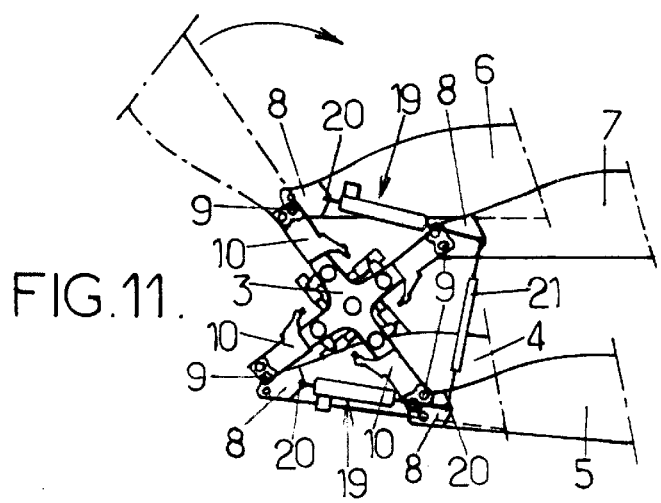

In FIG. 11, solid lines are used to represent the four blades 4 to 7 locked folded at the end of the folding sequence and, for unfolding, the procedure described with reference to FIGS. 6 to 11 must be carried out in reverse order, retraction of the jacks 19 being of course substituted for extension, and vice versa.

After the unfolding operation, by which the four blades 4 to 7 are returned to the flight configuration and locked in this position (FIG. 6), the two jacks 19 are withdrawn from the rotor 2. These two jacks 19 as well as the optional link rod 21 are therefore tools which are fitted only temporarily to the rotor 2 for the folding and unfolding operations, and which can be kept on this rotor 2 for as long as the blades have to be kept locked and folded.

As a variant, a single jack 19 is used, firstly to fold/unfold the two blades on one side, and then to fold/unfold the two blades on the other side.

In the case of a two-bladed rotor, as shown in FIGS. 12 and 13, this rotor is locked stationary after being lined up so that the two blades 22 and 23, diametrically opposite relative to the axis of rotation A—A of the rotor, are positioned transversely to the longitudinal axis L—L of the helicopter, the front of which is indicated by the arrow on the axis L—L (upwards in FIGS. 12 and 13). The two blades 22 and 23 locked in the flight configuration in this transverse position, are then connected to each other by a single linear actuator or jack 24 which is removably attached to the front of the blade 23 on the one hand and on the other to the rear of the blade 22, so as to avoid any interference with the rotor head, and in particular its hub 3 and the cuffs or arms 10 connecting the blades 22 and 23 to the hub 3, and so that this jack 24 can effectively exert a folding (or unfolding) force on the blades 22 and 23, substantially in the plane of rotation of these blades or rotor disc, the line of action of the jack 24, which extends along its longitudinal axis, extending towards the rear (i.e. in the direction of folding) of a virtual axis passing through the pivoting points of the two blades 22 and 23, i.e. through the two pivot pins 9 situated towards the rear, each of which constitutes the folding/unfolding axis of one respectively of the two blades 22 and 23. In the example in FIGS. 12 and 13, and as shown in more detail in FIG. 14, the single jack 24 is removably attached by each of its longitudinal ends at an attachment point 25 to the end of one respectively of two securing brackets 26 attached beforehand, preferably removably, one projecting towards the front on the leading edge of the root 8 of the blade 23, and the other securing bracket 26 projecting towards the rear on the trailing edge of the root 8 of the other blade 22.

The two blades are folded by first of all unlocking a first blade, such as 22, by withdrawing its front blade pin 9, then causing a first retraction of the jack 24 which bears against the other blade 23 kept locked in the flight configuration, so to cause the blade 22 to pivot towards the rear into the folded position (see FIG. 13) by pivoting about its pivot pin 9, then locking this blade 22 in this position by attaching it to the rear structure of the fuselage or tail boom of the helicopter for example by means of a folding pole, supports and straps as explained above. The second blade 23 is then unlocked by removing its front blade pin 9, and the jack 24 is caused to retract a second time, so as to cause this second blade 23 to pivot towards the rear about its rear pivot pin 9 until it reaches the folded position shown in FIG. 13, in which the second blade 23 is locked by attaching it, as for the blade 22, to the tail boom or rear structure of the helicopter.

To change from the position in FIG. 13 to the one in FIG. 12, the blades 22 and 23 are unfolded by a sequence repeating the operations described above in reverse order and by causing the jack 24 to extend twice in succession instead of causing them to retract twice when folding.

As a variant, the single jack 24 may be attached directly to the blades 22 and 23, but attaching them via the securing brackets 26 enables the blades to be standardised, which is more economical, by equipping them all with the same point 27 for attaching a securing bracket 26 to a corresponding blade. As shown in FIG. 14, which shows the blade 23 equipped with a securing bracket 26 projecting towards the front of the leading edge of its root 8, the securing bracket 26 may be formed as a stirrup straddling the leading edge of the blade root 8, and in such a way that the jack 24 is removably attached to the attachment point 25 on the front of the securing bracket 26, the rear of which is retained on the blade root 8, substantially in the middle of its chord, by the attachment point 27 formed by a transverse retaining pin. On the other blade such as 22, the same attachment point 27 attaches to the blade a securing bracket 26 shaped as a stirrup which straddles the trailing edge of the blade root 8, so that the jack 24 can be attached to the end of the stirrup 26 which projects towards the rear of this trailing edge.

It is therefore the positioning of the securing bracket 26 on the blade 22 or 23 which differentiates the blades.

In the case of a three-bladed rotor, as shown in FIGS. 15 and 16, the rotor is locked stationary lined up so as to position the one 28 of the three blades towards the rear and substantially aligned with the tail boom of the helicopter and with its longitudinal axis L—L, this rear blade 26 remaining locked by its two blade pins 9 in the flight configuration when it is locked in the rotor folding position, in which this rear blade 28 is preferably also attached, as in the previous examples, to the tail boom or structure of the rear part of the fuselage of the helicopter by attachment means such as folding poles, supports and straps as previously described.

To fold the other two blades 29 and 30 extending symmetrically one to the left and the other to the right of the helicopter, from their position locked in the flight configuration as shown in FIG. 15, two identical linear actuators or jacks 31 are used, each of which is removably attached to the rear blade 28 locked in this position, and to one respectively of the other two blades 29 and 30, locked in the flight configuration. Next, one of the two side blades, for example the blade 29, is unlocked by withdrawing its front blade pin 9, and the jack 31 which connects this blade 29 to the rear blade 28 is caused to retract, so that by pulling on this unlocked side blade 29, and by bearing against the locked rear blade 28, this jack 31 causes the blade 29 to pivot towards the rear by rotating about its pivot pin 9 to the rear position, until it reaches the folded position shown in FIG. 16, in which the blade 29 is locked folded by being attached as described above to the tail boom or structure of the rear part of the helicopter fuselage. The other side blade 30 is then unlocked by removing its front blade pin 9, then the other jack 31 which connects this blade 30 to the locked rear blade 28 is caused to retract so as to cause the blade 30 to pivot about its rear pivot pin 9 towards the rear, by the jack 31 pulling on this blade 30 and bearing against the locked rear blade 28, until the blade 30 is moved into the position folded towards the rear, as shown in FIG. 16, and in which this blade 30 is locked in the same way as the other side blade 29.

The blades are moved from the folded position (FIG. 16) to the unfolded position or flight configuration (FIG. 15) according to a reverse sequence in which the two jacks 31 are caused to extend instead of being caused to retract.

On the side blades 29 and 30, the attachment points 32 of the jacks 31 are situated, as are the attachment points 20 in the example in FIGS. 6 to 11, on the longitudinal pitch change axes X—X of the blades and radially on the outside of the blade pins 9 relative to the axis A—A of rotation of the rotor, and the two jacks 31 are preferably attached to the root 8 of the rear blade 28 at the same attachment point 32 positioned in the same way as on the other blades 29 and 30, so that the blades are standardised and comprise only a single attachment point 32, which is favourable in terms of weight and cost. As a variant, the two jacks 31 may be attached to the rear blades 28 at two adjacent points, with the disadvantage that this blade 28 is not standard and must be specially balanced to make it compatible with the other two blades 29 and 30 on the same three-bladed rotor. As a variant, a single jack 31 is used, firstly between the blades 28 and 29, and then between the blades 28 and 30, or vice versa.

FIGS. 17 and 18 show a rotor with five blades respectively locked in the flight configuration and folded towards the rear. The procedure and the device for folding/unfolding such a five-bladed rotor are the same as those described for the four-bladed rotor with reference to FIGS. 6 to 11, the only difference being that the rotor is initially locked stationary in a position in which one of the blades 33 extends towards the rear and is substantially aligned with the tail boom of the helicopter, in the same conditions substantially as the rear blade 28 of the three-bladed rotor in FIGS. 15 and 16. This rear blade 33 is therefore kept locked in the flight configuration by its two blade pins 9 in its "folded" position in which it is locked in addition by being attached to the tail boom or rear structure of the helicopter as described previously. The other four blades of the rotor are a front left blade 34 and a rear left blade 35, corresponding respectively to the blades 4 and 5 of the four-bladed rotor mentioned above, and on which is installed removably one of the two jacks 19 of the folding device, and a front right blade 36 and a rear right blade 37, corresponding to the blades 6 and 7 of the four-bladed rotor, and to which is removably attached the other linear jack 19 of the device, as on the four-bladed rotor (see FIG. 6). The sequence of folding of the four blades 34, 35, 36 and 37 is exactly the same as that of the blades 4, 5, 6 and 7 of the four-bladed rotor, and as has been described above, the attachment points of the jacks 19 to the blades being the same as the attachment points 20 in FIGS. 6 to 11.

Similarly, after the two rear side blades 35 and 37 are folded towards the rear, these two blades 35 and 37 may be connected to each other by a rectilinear, rigid link rod, similar to the rod 21 in FIGS. 9 to 11, and attached temporarily and removably to the two blades which it connects, for example at the points of attachment 20 of the two jacks 19 to these two blades 35 and 37. On the five-bladed rotor in FIGS. 17 and 18, another rectilinear, rigid link rod, such as 21, may be removably attached to the two front side blades 34 and 36, when these are locked folded (FIG. 18), in order also to strengthen the assembly constituted by these two pairs of blades folded and locked with the fuselage and the hub of the rotor.

As a variant, a single jack 19 may be used, in a first step to fold or unfold in succession the two blades on one side and then, in a second step to fold or unfold the two blades on the other side, the position of the rear blade 33 being unchanged.

FIGS. 19 to 21 show a sequence for folding the blades of a six-bladed rotor using only two jacks which may be similar to the jacks 19 used for folding/unfolding the four-bladed and five-bladed rotors as described above, but these two jacks 19 have to be moved to different positions on the rotor in the course of a folding or unfolding operation. As a first step, the rotor is locked stationary in a position in which the three blades 44, 45 and 48 of a first half of the rotor blades extend on one side of the longitudinal axis L—L of the helicopter, for example on the left side, looking towards the front of this axis L—L, indicated by an arrow on this axis, whereas the three blades 46, 47 and 49 of the second half of the rotor blades extend substantially symmetrically on the right side of the helicopter. The six blades being locked, each by its two blade pins 9, in the flight configuration, in this position, one of the two jacks 19 is installed, as in the examples of the four-bladed and five-bladed rotors, between the two rearmost blades 44 and 45 on the left side, being removably attached to each of them at an attachment point 20, positioned on the root 8 of the corresponding blade as explained above, and the other jack 19 is installed between and attached to the two rearmost blades 46 and 47 on the other side of the helicopter. These four blades 44, 45, 46 and 47 are then folded towards the rear according to a sequence which is identical to that described above for folding the blades 4, 5, 6 and 7 of the four-bladed rotor, according to FIGS. 6 to 11, and for folding towards the rear the blades 34, 35, 36 and 37 of the five-bladed rotor according to FIGS. 17 to 18.

The six-bladed rotor, the four rearmost blades 44, 45, 46 and 47 of which are locked folded towards the rear, is shown in FIG. 20. It then remains to fold towards the rear the two forward most blades 48 and 49. To this end, the jack 19 on the left side is separated at least from the rearmost blade 45 on the same side, and this left jack 19 is installed between and removably attached to the blades 44 and 48 on the left, which are respectively the second rearmost blade and the forward most blade on that side.

Similarly, the jack 19 on the right side is separated at least from the rearmost blade 47 on the right and locked folded, and this right jack 19 is installed between and removably attached to the two blades 46 and 49 on the right, which are respectively the second rearmost blade and the forwardmost blade on that side. One of the front blades 48 or 49 is then unlocked by removing its blade pin 9 situated nearest to the front and, by causing the jack 19 on the corresponding side to retract, this blade 48 or 49 is made to pivot towards the rear by rotating about its pivot pin 9, the rearmost and kept in place, and then this blade 48 or 49 is locked in position folded towards the rear (see FIG. 21) by attaching it, as explained above, to the rear part of the helicopter structure or to the tail boom or to the other blades previously folded and locked. The same actions are then taken for the other front blade 49 or 48, so that the six blades of the rotor are locked folded in the position shown in FIG. 21.

As a variant, a single jack 19 may be used, but it must be installed four times in succession on and between two adjacent blades, twice on each side of the helicopter, for example between the blades 44 and 45, then between the blades 44 and 48, then between the blades 46 and 47, and finally between the blades 46 and 49; or between the blades 44 and 45, then between the blades 46 and 47, then between the blades 44 and 48 or 46 and 49, and finally between the blades 46 and 49 or 44 and 48.

The folding procedure described above may also be applied to any number of blades greater than six, although rotors with more than six blades are not easily made compatible with blade folding/unfolding capabilities.

In the figures showing the folding of four-bladed, five-bladed and six-bladed rotors, it will be noted that on each side of the helicopter the rearmost blade of the rotor, in the folded position, occupies the top position in a vertical plane, whereas the forwardmost blade, in the folded position, occupies the bottom position in a vertical plane. However, depending on the configuration, geometry and operating mechanisms proper to each rotor, the relative positions of the blades in a vertical plane, in the folded position, may be different from that shown in the drawings.

In the course of folding the blades of the six-bladed rotor in FIGS. 19 to 21, a rectilinear, rigid link rod, similar to the rod 21 in FIGS. 9 to 11, may be removably attached, under the same conditions and with the same purpose as in FIGS. 9 to 11, between the two rearmost folded and locked blades 45 and 47, to strengthen the bearing point of the jacks 19 for retracting the blades 44 and 46 towards the rear, and/or another link rod also similar to the rod 21 may also be removably attached to the second rearmost blades 44 and 46 locked folded, to strengthen the bearing points of the two jacks 19 for folding the two front blades 48 and 49 towards the rear.

A telescopic link rod may also be used, installed firstly between the blades 45 and 47 folded and locked, then after folding the blades 44 and 46 towards the rear, between these latter two blades 44 and 46, for folding the front blades 48 and 49. This operation makes it necessary to adjust the length of the telescopic rod to a first value, to attach it removably to the blades 45 and 47, and then to detach this rod from these blades 45 and 47, alter its length and set it to a second value suitable for connecting it removably to the blades 44 and 46, for example at the attachment points 20 on these different blades. As a variant, a non-active jack may be used as a link rod.

The variable-length linear actuator or jack 19, 24 or 31 of the examples of rotors described above may be a double-acting linear jack suitable for exerting on the two blades to which this jack is removably attached forces in both directions along the longitudinal axis of this jack. Such a jack, of simple and lightweight structure, small in size and easy to install on the two blades and to remove from the latter, is preferably such as shown in FIGS. 22 and 23.

These show a mechanical jack with a tubular body 50 in which a rectilinear rod 51 is fitted and is telescopic axially. The rod 51 is itself tubular and its part inserted axially in the body 50 encloses at least a part of a worm screw 52, preferably reversible for the reason indicated below, with which the rod 51 is engaged. This worm screw 52 is fitted so as to rotate coaxially and retained in a fixed axial position in the body 50, in which the axis of the worm screw 52, at the end opposite the rod 51, is integral in rotation with a bevel output gearwheel 54 of bevel gears 53, a bevel input pinion 55 of which is meshed with the gearwheel 54, so as to constitute a reduction stage, and the input pinion 55 is integral in rotation with an input shaft 56 extending radially (perpendicularly to the common longitudinal axis of the body 50, the rod 51 and the worm screw 52) and running through the wall of the body 50, so as to be accessible from outside the body 50, into a drive casing 57 integral with the body 50 and projecting radially towards the outside of the latter, and in which the end of a hand crank may be inserted to drive manually the mechanical jack thus produced, or the end of a reversible screwdriver with an electric motor powered from a battery and therefore self-contained and easy to use in succession on the different jacks which may be fitted on the same rotor to fold or unfold the blades.

It will be understood that driving the input shaft 56 in rotation in one or other direction causes the rod 51 to move axially in one or other direction along the longitudinal axis of the body 50, via the mechanical drive device with multiplication of force at the rod 51 which is constituted by the bevel gears 53 and the worm screw 52.

The jack also comprises a manually operated mechanism to disengage the rod 51, and this mechanism, not shown in detail in the drawings but of known structure, allows the bevel pinion 55 to be moved in the direction of the input shaft 56 so as to move the pinion 55 away from the bevel gear wheel 54, which allows the length of the jack to be adjusted quickly and easily by moving its rod 51 relative to its body 50, for installing and attaching the jack to the two blades which it is intended to connect, when the worm screw 52 is reversible.

To this end, the jack is equipped at its two axial ends with the end fittings 58 and 59 for attaching removably and quickly and with no special tools to compatible attachment devices fitted to the blades.

In the example in FIGS. 22 and 23, the end fittings 58 and 59 are tubular end fittings, transverse relative to the longitudinal axis of the jack, one of which 58 is at the end of the rod 51 which is external to the body 50 and constitutes an end elbow of this rod 51, while the other tubular end fitting 59 is integral with the end external to the body 50 of a small sleeve 60, fitted so as to slide axially through the end of the body 50 at the opposite end to the rod 51, and such that the end internal to the body 50 of this sleeve 60 constitutes a stop limiting the movement of the sleeve 60 and of the end fitting 59 axially towards the outside of the body 50. A helical spring 61 is wound about the sleeve 60 bearing at one end against the body 50 and at the other against the end fitting 59, so that this spring 61 provides a certain axial elasticity for the jack, being in series with the end fitting 59 and the body 50, in order to limit abnormal loads produced in particular by impacts during manoeuvres to bring together the different parts in motion, and in particular when a blade connected to one of the end fitting 58 or 59 reaches the end of its travel in the unfolded position, by bearing against another blade via the other end fitting 59 or 58 of the jack. Other elastic means in series with the other end fitting 58 or with the rod 51 may also be used and embodied in a different form, for example in the form of a block of elastically deformable material such as an elastomer.

In the example in FIGS. 22 and 23, the transverse tubular end fittings 58 and 59 of the jack, when they are coupled to the corresponding attachment devices on the blades, enable the body 50 and the rod 51 of the jack to be offset in a vertical plane to avoid any interference with the rotor components situated above the blades. These end fittings 58 and 59 contribute to the link between the jack and the blades which these end fittings provide in combination with attachment devices fitted to the blades, at the attachment points 20, 27 and 32 of the examples of rotors described previously, and in such a way that this connection between the jack and the blades fulfils two functions, namely transmitting the axial forces of the jack to the two blades which it links, these forces being substantially parallel to the plane of the blades (plane of the rotor disc) and allowing the jack to swivel, by a joint with three degrees of freedom, to avoid moments induced in the joint by a combination of the pivoting of a blade and of the generally non-zero angle of attack of this blade.

The attachment devices fitted to the blades to provide the removable joints of the end fittings 58 and 59 of the jack to the blades, may be either entirely fitted onto the blades, and are then removable attachment devices not forming part of the structure of the blade, which may still be a standard blade, or completely or partially integrated in the structure of the blade so that the latter is specific to the folding, and in this case the attachment devices fitted to each blade may comprise one or more elements inserted in the blade, in particular its root or portion of root, and one or more removable elements, fitted onto the element or elements inserted in the blade.

To reduce working time when connecting a jack end fitting to a blade, or when separating them, a quick-locking ball joint is used.

As shown in FIG. 24, the swivel ball 62 projects above a support plate 63 which is attached to the root 8 of the corresponding blade by two screws 64 screwed into tubular inserts 65 with a threaded internal bore sunk in the blade root 8 so that the openings of their threaded bores are flush with the upper face of the blade root 8.

Each tubular end fitting 58, 59 of the jack such as 19, 24 or 31, has a recess 66 (see FIG. 23) by which the corresponding end fitting 58, 59 can fit onto the swivel ball 62 fitted to the blade. As shown in FIG. 25, a known locking device, using a key or, as shown in this figure, a finger 67 loaded by a calibrated spring towards the inside of the recess 66, prevents accidental release of the end fitting 58, 59 of the jack when this end fitting is fitted onto the swivel ball 62. This finger 67 may be moved manually against the spring which loads it, so as to clear the way for the swivel ball 62 to come out of the recess 66 when the end fitting 58, 59 is withdrawn, when the jack is separated from the corresponding blade.

In the assembly shown in FIG. 24, the support plate 63, with which the swivel ball 62 is integral, provides proper distribution of the forces in the blade root 8, but it is also possible, as in the variant shown in FIGS. 26 and 27, for the swivel ball 62 to be integral with a threaded support pin 68 which is screwed into a tubular insert 69 with a threaded internal bore and designed to be permanently sunk into the blade root 8. In this case, the swivel ball 62 is removable with its support pin 68, which is screwed into the insert 69 to allow a folding jack to be fitted. FIG. 27 shows the assembly of the swivel ball 62, its support pin 68 and the insert 69 fitted in a blade root 8 and being centered in a plane midway between the sleeves 70 also sunk into the blade root 8 to receive the blade pins 9.

As a variant, the swivel ball 62 may be integral with a support 69 which directly constitutes an insert sunk into the blade root 8, in which case the swivel ball 62 remains installed on the blade even outside the operations of folding/unfolding the blades.

The swiveling function may also be integrated into the end fittings of the jack 19, 24 or 31. In this case, as shown in FIG. 28, the jack 19, 24 or 31 is fitted at each of its longitudinal ends with a conventional ball joint end fitting 71, the swivel ball 72 of which is retained removably on the blade root 8 by means of a pin 73 integrated in this blade root 8.

As a variant, the device or devices removably attaching a jack to a blade may or may not be entirely fitted onto the blade, without altering the structure of this blade. An example of this variant is shown in FIGS. 29 and 30, in which the removable attachment device is a removable retaining collar 74 which supports a swivel ball 75 projecting from the upper face of the blade root 8. The retaining collar 74, when it is assembled, has the form of a sleeve the inner bore of which is shaped so as to fit over the changing cross-section portion of the blade root 8, between the normal part of the blade and the end portion of this blade root 8 which is fitted into the outer radial end yoke 11 of the cuff or arm 10 connecting it to the hub which has the two blade pins 9 running through it when this blade is locked in the flight configuration. The retaining collar 74 thus fitted over the blade root 8 is locked on this blade root 8 by form fitting, and is held along the longitudinal axis of the corresponding blade in the position in which it grips the changing cross-section portion of the blade root 8 by means of a spacer 76, which keeps the retaining collar 74 spaced radially towards the outside of the pivot pin 9 (towards the rear of this blade) about which pivot pin 9 this spacer 76 pivots with the retaining collar 74 and the blade.

As a variant, the retaining collar 74 supports, instead of the swivel ball 75, a pin such as the retaining pin 73 in FIG. 28, to cooperate with the swivel 72 of a ball joint end fitting 71 of a jack (see FIG. 28). However, as shown in FIGS. 29 and 30, the retaining collar 74 with swivel 75 may cooperate with end fittings such as 58, 59 with recesses 66 for removably attaching jacks as shown in FIGS. 22, 23 and 25.

To fulfil its function, it will be understood that the retaining collar 74 in FIGS. 29 and 30 is completely locked relative to the blade, so that the loads from the jacks do not cause any relative movement between the blade and the retaining collar 74, which would result in damage to the blade or the hub, or the arm or cuff 10 connecting it to the latter. The form fitting between the retaining collar 74 and the changing cross-section portion of the blade root 8 enables all the movements of rotation of the retaining collar 74 relative to the blade to be locked, as well as relative movements, since slippage of the retaining collar 74 towards the cuff or arm 10 of the hub is prevented by the spacer 76, constituting a pivoting connecting device between the retaining collar 74 and the hub or its arm or cuff 10.

In the examples of rotors described above with reference to the figures, conventional blade pins 9 are used to provide the joint between the blades and the cuffs or arms connecting them to the hub 3. However, to facilitate extraction and insertion of these blade pins 9, and in particular of the front pin, which must be removable to allow the blades to be folded by pivoting towards the rear about the rear blade pin, it is preferable to use at least one front blade pin of the expanding pin type, well known, such as described in U.S. Pat. No. 3,192,820, the use of which on rotary-wing aircraft rotors with manual folding blades is well known, and in particular proposed in FR 00 16065. These expanding pins are lever pins, on which the operation of the lever, by means of an eccentric, axially compresses devices forming an elastic bellows in a cylindrical pin barrel, which has the effect of slightly increasing the diameter of this barrel, and therefore of locking it in a sleeve inserted into a blade root to receive an expanding pin of this type.

The invention has now been described in detail for the purposes of clarity of understanding. It will, however, be appreciated that certain changes and modifications may be practical within the scope of the appended claims.

What is claimed is:

1. A method of folding/unfolding at least one blade of a multi-bladed rotor of a rotary-wing aircraft, with at least a first blade being connected to a hub of the rotor by a coupling comprising a pivotal connection defining a pivot axis and a releasable connection, release of which allows its blade to be pivoted about its pivot axis between an unfolded position and a folded position, the method comprising steps:

(a) removably attaching at least one variable-length linear actuator to the first blade and a second blade, each locked in a fixed position with respect to the hub which is itself locked stationary;
 (b) releasing the first blade from its fixed position with respect to the hub;
 (c) actuating the linear actuator to vary its length and bear against the second blade, thereby pivoting the first blade about its pivot axis to a new position with respect to the hub; and
 (d) locking the first blade in the new position.

2. A method according to claim 1, wherein the second blade is connected to the hub of the rotor in an analogous way to the first blade, and wherein the method further comprises after step (d) steps:

(e) releasing the second blade from its fixed position with respect to the rotor;
 (f) actuating the linear actuator to vary its length and bear against the first blade, thereby pivoting the second blade about its pivot axis to a new position with respect to the hub; and
 (g) locking the second blade in its new position.

3. A method according to claim 2, further comprising before step (f):

removably attaching a link rod to the first blade locked in its new position and to a third blade whose position is fixed with respect to the hub, whereby under subsequent actuation the linear actuator bears against the first and third blades together when the second blade pivots about its axis.

4. A method according to claim 2, wherein the multi-bladed rotor is a two-bladed rotor with the blades being foldable towards a rear part of the rotary-wing aircraft, and wherein the method further comprises:

locking the stationary rotor with the first and second blades aligned substantially transversely to a longitudinal axis of the rotary-wing aircraft; and attaching pivotally the linear actuator to a forward part of one blade and a rearward part of the other blade such that the linear actuator extends rearwardly of a line passing through the pivot axes of the two blades, and such that the linear actuator is disposed rearwardly of the hub of the rotor.

5. A method according to claim 4, wherein the linear actuator is attached to the blades via two securing brackets, one projecting forwardly of a leading edge of one blade and another projecting rearwardly of a trailing edge of the other blade.

6. A method according to claim 1, wherein the multi-bladed rotor is a three-bladed rotor, with the blades being foldable towards a rear part of the rotary-wing aircraft, and with a third blade connected to and fixed in position with respect to the hub of the rotor in an analogous way to the first blade, and wherein the method further comprises:

locking the stationary rotor with the second blade aligned over the rear part of the rotary-wing aircraft;

removable attaching a variable-length linear actuator to the second and third blades;

releasing the third blade from its fixed position;

actuating the linear actuator to vary its length and pivot the third blade about its pivot axis to a new position with respect to the hub; and locking the third blade in its new position.

7. A method according to claim 6, wherein the linear actuator between the first and second blades and the linear actuator between the third and second blades are attached substantially to a common attachment point on the second blade, the common attachment point being substantially aligned with a longitudinal axis of the second blade and radially outwardly of any pivot axis the second blade has relative to an axis of rotor rotation.

8. A method according to claim 2, wherein the multi-bladed rotor has at least four blades, with the blades being foldable towards a rear part of the rotary wing aircraft, and with a third blade and a fourth blade each connected to and fixed in position with respect to the hub of the rotor in an analogous way to the first blade, and wherein the method further comprises:

locking the stationary rotor with the first and second blades disposed on one side of the rotary-wing aircraft and the third and fourth blades disposed on an opposite side, with the first blade rearwardly of the second blade and the third blade rearwardly of the fourth blade;

carrying out steps (a) to (d) so that the new position of the first blade is over the rear part of the rotary wing aircraft;

repeating steps (a) to (d) for the third blade in place of the first blade so that the third blade is positioned adjacent the first blade;

carrying out steps (e) to (f) for the second blade so that the second blade is positioned adjacent the first blade;

repeating steps (e) to (f) for the fourth blade in place of the second blade so that the fourth blade is positioned adjacent the third blade.

9. A method according to claim 8, further comprising connecting the first blade to the third blade with a removable link when the first blade is in the new position and the third blade is positioned adjacent to it.

10. A method according to claim 8, wherein the stationary rotor is locked with one blade positioned over the rear part of the rotary wing aircraft when the multi-bladed rotor has an odd-number of blades.

11. A method according to claim 8, wherein the multi-bladed rotor has more than five blades, and wherein the method further comprises:

removing the linear actuator between the first and second blades once pivoted respectively to the new position over the rear part of the rotary wing aircraft and adjacent to the new position;

removably attaching the linear actuator between the second and a fifth blade connected to and fixed in position with respect to the hub of the rotor in an analogous way to the first blade;

and repeating steps (e) to (f) for the fifth blade in place of the second blade so that the fifth blade is positioned adjacent the second blade.

12. A method according to claim 1, wherein the first blade is locked in the folded position by attaching said blade to a rear part of the rotary wing aircraft by at least one attachment tool selected from the group consisting of a pole, a folding pole, strapping and a support.

13. Apparatus for folding/unfolding at least one blade of a multi-bladed rotor of a rotary-wing aircraft, with at least a first blade being connected to a hub of the rotor by a coupling comprising a pivotal connection defining a pivot axis and a releasable connection, release of which allows its blade to be pivoted about its pivot axis between an unfolded position and folded position, the apparatus comprising:

at least one variable length, removable linear actuator configured to be removably attached to two adjacent blades of the rotor and to exert forces in either direction along its longitudinal axis on two blades connected by the linear actuator; and connectors for removably attaching the linear actuator to two adjacent blades, each connector comprising an end fitting integral with the linear actuator and an attachment device configured for attachment to one blade, the end fitting and the attachment device being releasably interconnectable.

14. Apparatus according to claim 13, comprising two substantially identical linear actuators, each having at each of its two longitudinal ends an end fitting for attaching removably to at least one attachment device configured for attachment to a blade.

15. Apparatus according to claim 13, further comprising at least one substantially rectilinear removable link rod configured for removable attachment to two blades via releasable connectors at opposed ends of the link rod.

16. Apparatus according to claim 13, wherein the at least one removable linear actuator comprises at least one double-acting linear jack comprising at least one rectilinear rod configured to move a either direction in a jack body into which said rod is partially inserted and drivable by a drive device housed in the body.

17. Apparatus according to claim 16, wherein said jack is one of mechanical and electromechanical with the body housing a mechanical drive device which is configured to multiply forces imparted to the rod.

18. Apparatus according to claim 17, wherein the mechanical drive device comprises at least one stage of reduction gearing comprising at least one input shaft configured to be driven from outside the jack by one of a mechanical or electromechanical device.

19. Apparatus according to claim 18, wherein the at least one reduction stage comprises gearing selected from the group consisting of a worm screw, a rack-and-pinion combination and a gearwheel-pinion combination.

20. Apparatus according to claim 18, wherein the mechanical drive device comprises a worm screw engaged with the rod which is tubular, the worm screw partially extended into the tubular rod, with the worm screw being rotatably driven by an output gearwheel of a pair of bevel gears, an input pinion of which is integral with the input shaft.

21. Apparatus according to claim 17, wherein the jack further comprises a manually operated mechanism for disengaging the rod from the mechanical drive device and allowing rapid adjustment of the jack to any desired length.

22. Apparatus according to claim 16, wherein the jack further comprises a shock absorber in series with at least one of the rod, the body and one end fitting of the jack.

23. Apparatus according to claim 13, wherein at least one connector for removably attaching the linear actuator to adjacent blades, comprises at least one ball joint for connecting at least one end fitting to its respective attachment device.

24. Apparatus according to claim 23, wherein the at least one ball joint comprises at least one swivel ball of at least one ball joint end fitting for cooperating with an attachment pin of its respective attachment device.

25. Apparatus according to claim 23, wherein the at least one ball joint comprises:

at least one swivel ball supported by the attachment device so that in use the swivel ball projects above a root portion of its blade; and at least one sleeve of an elbow end fitting for removably attaching the linear actuator, the at least one sleeve being configured to fit and be releasably locked onto said swivel ball.

26. Apparatus according to claim 25, wherein the at least one swivel ball is supported by a support retained by at least one pin or screw in at least one insert of the attachment device which is integrated into a root portion of its blade.

27. Apparatus according to claim 25, wherein the at least one swivel ball is supported by a support integrated as an insert in a root portion of its blade.

28. Apparatus according to claim 23, wherein at least one attachment device comprises at least one attachment element fitted by a removable attachment into at least one insert integrated into a root portion of the blade.

29. Apparatus according to claim 23, wherein at least one attachment device is configured to be removably fitted to its respective blade.

30. Apparatus according to claim 29, wherein the at least one attachment device comprises a retaining collar supporting one of a swivel or a pin cooperating with a swivel ball, the retaining collar being removable and configured to grip part of a root portion of a blade and be locked thereto by snug fitting and by a spacer keeping the retaining collar radially spaced towards the outside of the pivot axis of the blade, about which the spacer is pivotable with the retaining collar and the blade.

* * * * *